United States Patent
Ward et al.

(10) Patent No.: US 8,038,405 B2
(45) Date of Patent: Oct. 18, 2011

(54) SPRING SEAL FOR TURBINE DOVETAIL

(75) Inventors: John D. Ward, Woodruff, SC (US);
Omprakash Samudrala, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 719 days.

(21) Appl. No.: 12/168,939

(22) Filed: Jul. 8, 2008

(65) Prior Publication Data

US 2010/0007096 A1   Jan. 14, 2010

(51) Int. Cl.
*F01D 5/30* (2006.01)
(52) U.S. Cl. .................... 416/219 R; 416/220 R
(58) Field of Classification Search .......... 416/219 R, 416/220 R, 221, 239, 248
See application file for complete search history.

(56) References Cited

U.S. PATENT DOCUMENTS

| | | | |
|---|---|---|---|
| 3,023,998 A * | 3/1962 | Sanderson, Jr. ............ | 415/173.7 |
| 3,709,631 A | 1/1973 | Karstensen et al. | |
| 4,422,827 A | 12/1983 | Buxe et al. | |
| 4,480,957 A | 11/1984 | Patel et al. | |
| 4,494,909 A | 1/1985 | Forestier | |
| 4,725,200 A | 2/1988 | Welhoelter | |
| 4,743,164 A | 5/1988 | Kalogeros | |
| 4,743,166 A | 5/1988 | Elston, III et al. | |
| 5,052,890 A | 10/1991 | Roberts | |
| 5,052,893 A | 10/1991 | Catte | |
| 5,139,389 A | 8/1992 | Eng et al. | |
| 5,257,909 A | 11/1993 | Glynn et al. | |
| 5,599,170 A | 2/1997 | Marchi et al. | |
| 5,823,743 A | 10/1998 | Faulkner | |
| 6,273,683 B1 | 8/2001 | Zagar et al. | |
| 6,296,172 B1 | 10/2001 | Miller | |
| 6,375,429 B1 | 4/2002 | Halila et al. | |
| 6,565,322 B1 | 5/2003 | Lieser et al. | |
| 6,575,704 B1 | 6/2003 | Tiemann | |
| 6,682,307 B1 | 1/2004 | Tiemann | |

FOREIGN PATENT DOCUMENTS

| | | |
|---|---|---|
| EP | 0774048 A1 | 5/1997 |
| WO | 9412772 A1 | 6/1994 |

* cited by examiner

*Primary Examiner* — Matthew W Such
*Assistant Examiner* — Ali Naraghi
(74) *Attorney, Agent, or Firm* — Sutherland Asbill & Brennan LLP

(57) ABSTRACT

A spring seal system for a turbine dovetail tab. The spring seal system may include a sealing slot positioned about the tab and a spring seal positioned within the sealing slot. The spring seal may include a substantial "U" shape.

16 Claims, 4 Drawing Sheets

SPRING SEAL FOR TURBINE DOVETAIL

TECHNICAL FIELD

The present application relates generally to any type of turbine and more particularly relates to systems and methods for sealing a gap formed between a turbine bucket dovetail and a turbine rotor via a spring seal.

BACKGROUND OF THE INVENTION

Gas turbines generally include a turbine rotor (wheel) with a number of circumferentially spaced buckets (blades). The buckets generally may include an airfoil, a platform, a shank, a dovetail, and other elements. The dovetail of each bucket is positioned within the turbine rotor and secured therein. The airfoils project into the hot gas path so as to convert the kinetic energy of the gas into rotational mechanical energy. A number of cooling medium passages may extend radially through the bucket to direct an inward and/or an outward flow of the cooling medium therethrough.

Leaks may develop in the coolant supply circuit based upon a gap between the tabs of the dovetails and the surface of the rotor due to increases in thermal and/or centrifugal loads. Air losses from the bucket supply circuit into the wheel space may be significant with respect to blade cooling medium flow requirements. Moreover, the air may be extracted from later compressor stages such that the penalty on energy output and overall efficiency may be significant during engine operation.

Efforts have been made to limit this leak. For example, one method involves depositing aluminum on a dovetail tab so as to fill the gap at least partially. Specifically, a circular ring may be pressed against the forward side of the dovetail face. Although this design seals well and is durable, the design cannot be easily disassembled and replaced in the field. Rather, these rings may only be disassembled when the entire rotor is disassembled.

There is thus a desire for improved dovetail tab sealing systems and methods. Such systems and methods should adequately prevent leakage therethrough so as to increase overall system efficiency while being installable and/or repairable in the field.

SUMMARY OF THE INVENTION

The present application thus provides a spring seal system for a turbine dovetail tab. The spring seal system may include a sealing slot positioned about the tab and a spring seal positioned within the sealing slot. The spring seal may include a substantial "U" shape.

The present application further provides a spring seal system for a turbine dovetail tab. The spring seal system may include a sealing slot positioned about the tab and a spring seal positioned within the sealing slot. The sealing slot may define a first leg and a second leg. The spring seal may include an opening facing the second leg.

The present application further provides a method of sealing a gap between a dovetail tab and a rotor of a turbine. The method includes the steps of positioning a spring seal within a sealing slot of the dovetail tab, operating the turbine, and expanding the spring seal into the gap.

These and other features of the present application will become apparent to one of ordinary skill in the art upon review of the following detailed description when taken in conjunction with the several drawings and the appended claims.

DETAILED DESCRIPTION

Figure 1A:
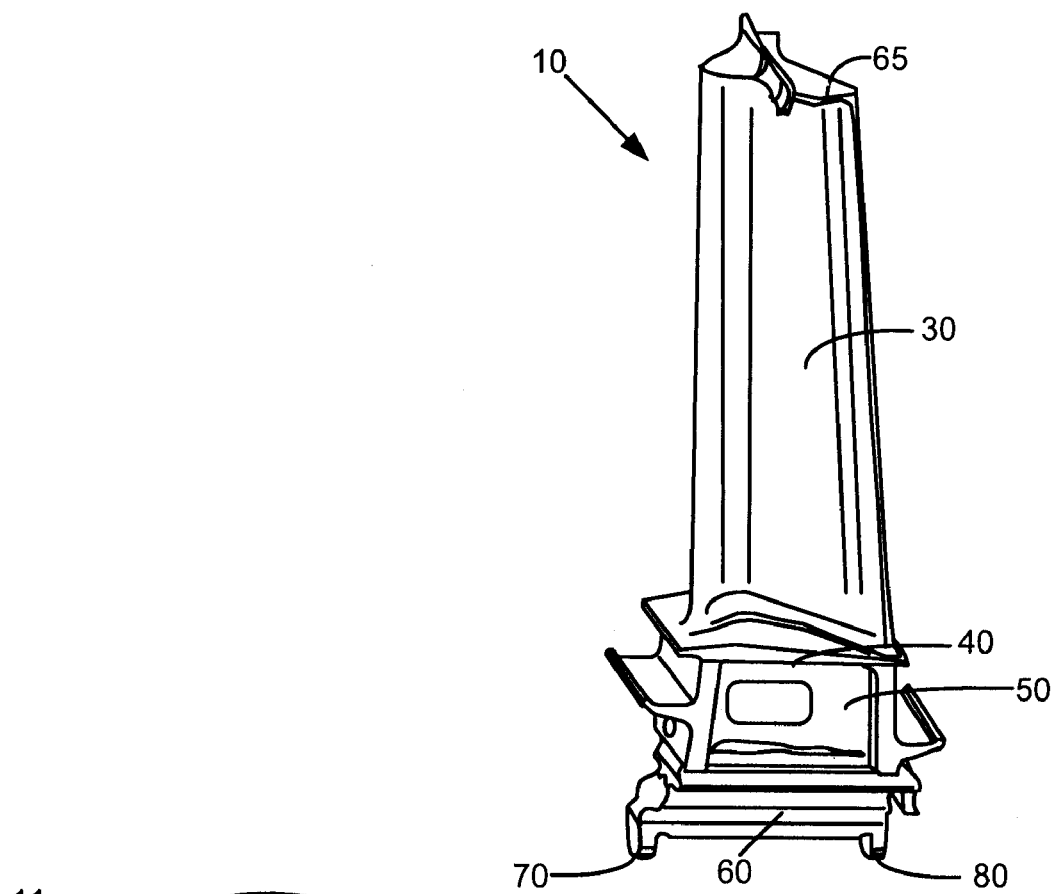
FIG. 1A is a perspective view of a bucket with a shroud that may be used with the sealing systems as are described herein.
Figure 2:
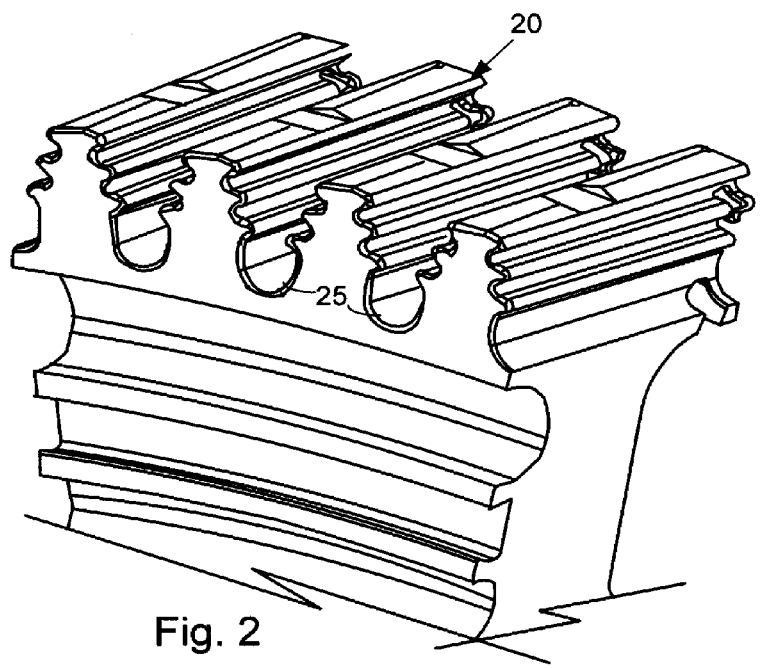
FIG. 2 is a perspective view of a rotor that may be used with the sealing systems as are described herein.
Figure 3:
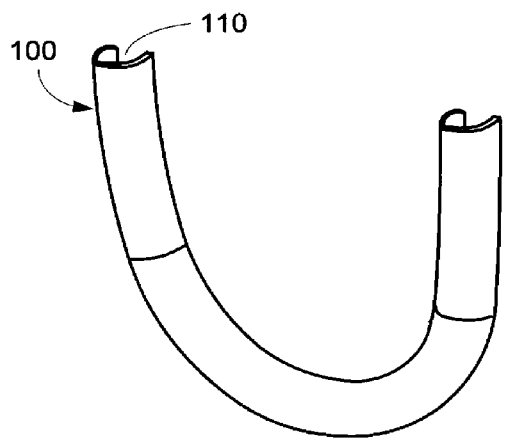
FIG. 3 is a front side perspective view of a spring seal as is described herein.
Figure 4:
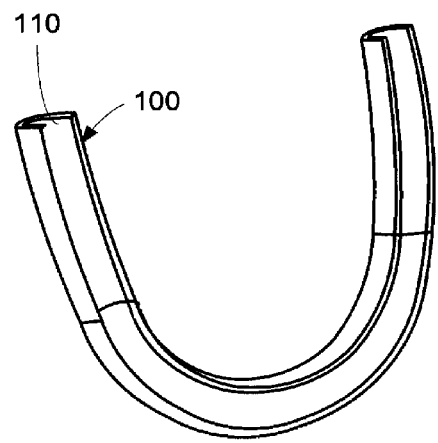
FIG. 4 is a rear side perspective view of the spring seal of FIG. 3.
Figure 5:
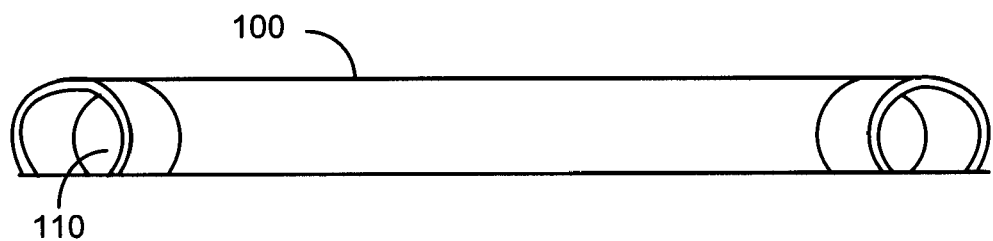
FIG. 5 is a side plan view of the spring seal of FIG. 3.
Figure 6:
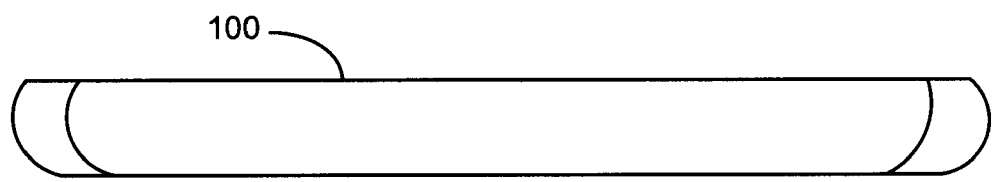
FIG. 6 is a further side plan view of the spring seal of FIG. 3.

Referring now to the drawings, in which like numerals refer to like elements throughout the several views, FIG. 1A shows a bucket 10 as may be used herein. The bucket 10 may be a first or a second stage bucket as used in a 7FA+e gas turbine sold by General Electric Company of Schenectady, N.Y. Any other type of bucket or stage also may be used herein. The bucket 10 may be used with a rotor 20 as is shown in FIG. 2.

Figure 1B:
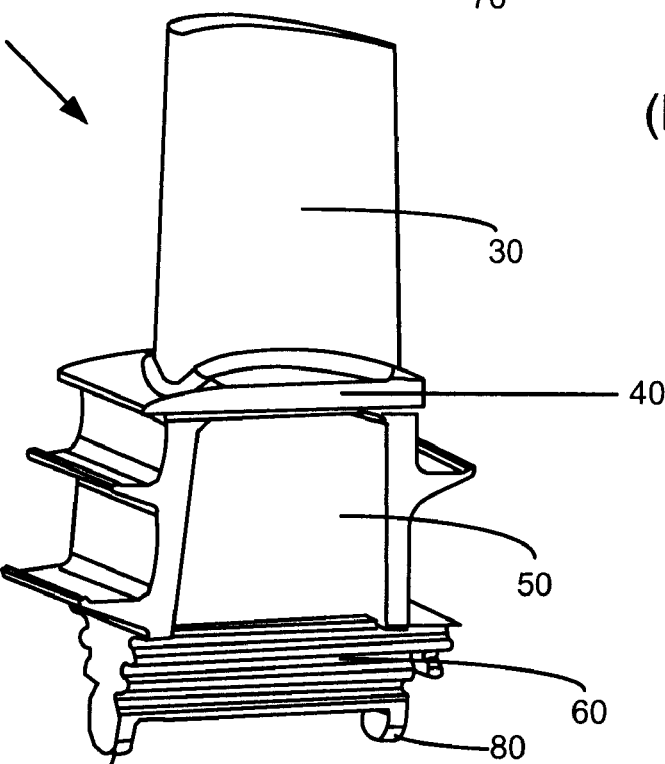
FIG. 1B is a perspective view of a bucket without a shroud that may be used with the sealing systems as are described herein.

As is known, the bucket 10 may include an airfoil 30, a platform 40, a shank 50, a dovetail 60, and other elements. It will be appreciated that the bucket 10 is one of a number of circumferentially spaced buckets 10 secured to and about the rotor 20 of the turbine. The bucket 10 of FIG. 1A has a shroud 65 on one end of the airfoil 30. A bucket 11 of FIG. 1B lacks the shroud. Any other type of bucket design may be used herein.

As described above, the rotor 20 may have a number of slots 25 for receiving the dovetails 60 of the buckets 10, 11. Likewise, the airfoils 30 of the buckets 10, 11 project into the hot gas stream so as to enable the kinetic energy of the stream to be converted into mechanical energy through the rotation of the rotor 20. The dovetail 60 may include a first tang or tab 70 and a second tab 80 extending therefrom. Similar designs may be used herein. A gap 90 may be formed between the ends of the tabs 70, 80 of the dovetail 60 and the rotor 20. A high pressure cooling flow may escape via the gap 90 unless a sealing system of some type is employed.

FIGS. 3-6 show a spring seal 100 as is described herein. As is shown, the spring seal has an axial opening 110 along one side thereof. In other words, the spring seal 100 is largely tube like in shape with a portion removed so as to form a substantial "C" shape along its cross-section. The spring seal 100 also may be in the form a substantial "U" shape so as to fit within the dovetail tab 70, 80. Other shapes and configurations may be used herein.

The spring seal 100 may be made out of a high temperature resistant material with elastic characteristics. Examples include alloys of nickel, iron, or cobalt, various types of stainless steels, and other types of materials. An alloy may be a cobalt based super alloy such as Inconnel X-750, A-286, and similar materials. The spring seal 100 may be a single element or several sections may be joined together. The spring seal 100 may be made by rolling a sheet of material into a "C" shape and then forming the "C" shape into the final design such as the "U" shape shown. Alternatively, the spring seal 100 may be formed as a continuous ring which then may be milled to create the "C" cross-section and then cut in half to yield two (2) "U" shaped seals. The use of the "U" shape allows the spring seal 100 to be used with the tabs 70, 80 as will be described in more detail below.

Figure 7:
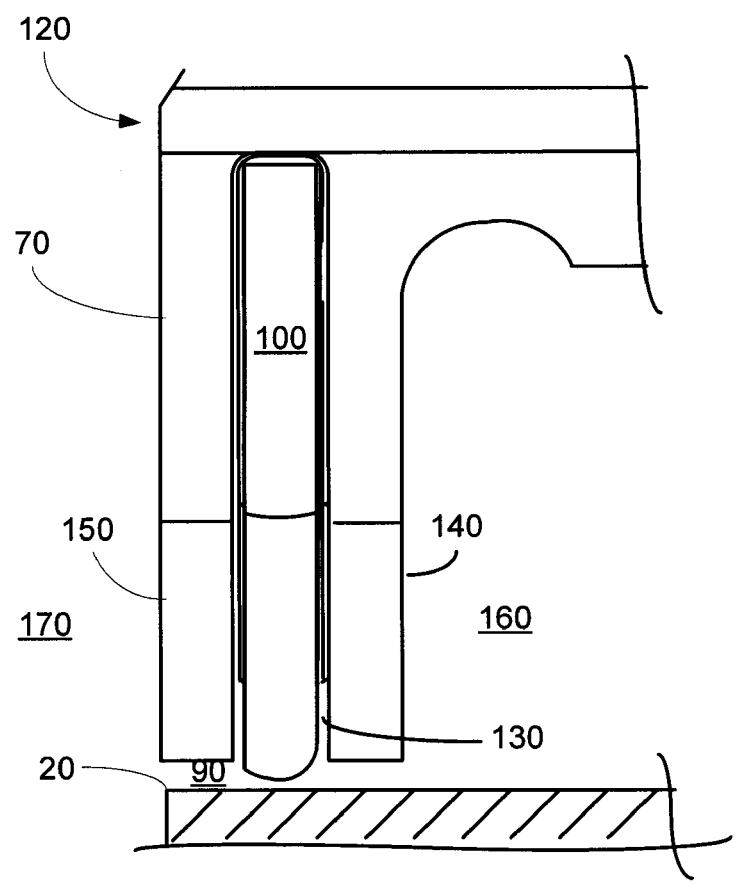
FIG. 7 is a side plan view of the spring seal of FIG. 3 installed within a dovetail tab.
Figure 8:
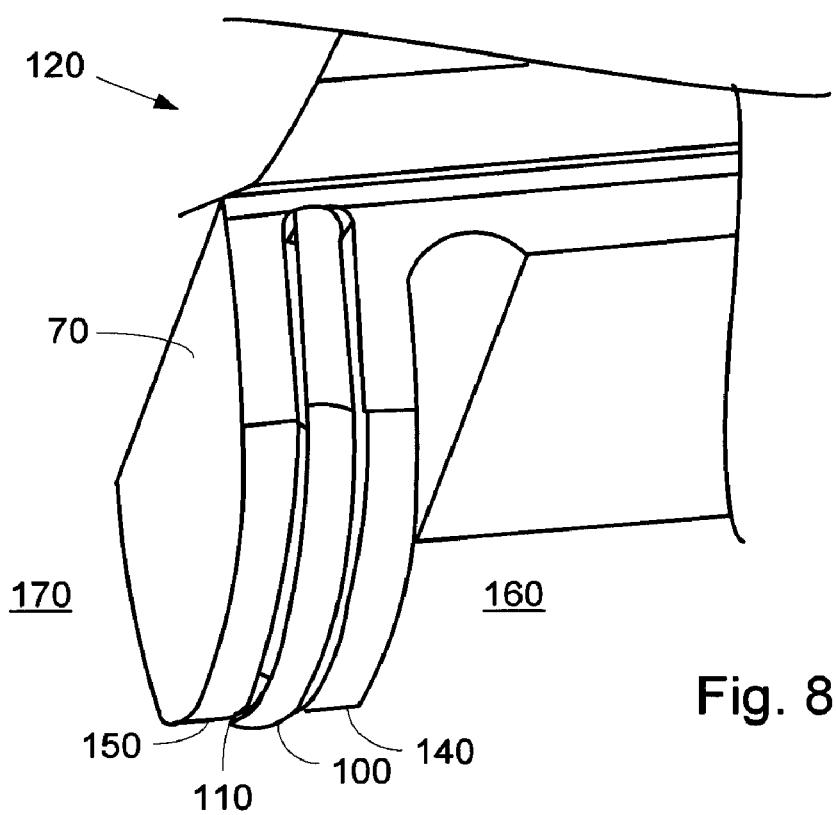
FIG. 8 is a bottom perspective view of the spring seal of FIG. 3 installed in a dovetail tab.

FIGS. 7 and 8 show a spring seal system 120 as is described herein. The spring seal system 120 may be positioned about and within the first tab 70 of the dovetail 60 of the bucket 10. The spring seal system 120 may include a sealing slot 130 positioned within the first tab 70. The sealing slot 130 may extend about the parameter of the first tab 70 in whole or in-part. The dimensions and shape of the sealing slot 130 may vary. The sealing slot 130 may be formed with conventional machining techniques or other types of manufacturing technique. The spring seal system 120 also may be used with the second tab 80 and elsewhere.

The sealing slot 130 defines a first leg 140 and a second leg 150 within the tab 70 and with the sealing slot 130 therebetween. The first leg 140 may be positioned adjacent to a high pressure side 160 of the dovetail 60. The high pressure side 160 may provide the bucket cooling air supply. The second leg 150 may be positioned about a low pressure side 170, i.e., the wheel space.

The spring seal 100 may be positioned within the sealing slot 130 of the spring seal system 120. The axial opening 110 may face the second leg 150 and the low pressure side 170. Other orientations and configurations of the spring seal 100 may be used herein. Upon operation of the bucket 10, the spring seal 100 expands into the gap 90 so as to block or reduce the loss of cooling fluid. Specifically, the spring seal 100 compresses upon assembly and expands upon turbine operation due to its inherent elastic characteristics.

Figure 9:
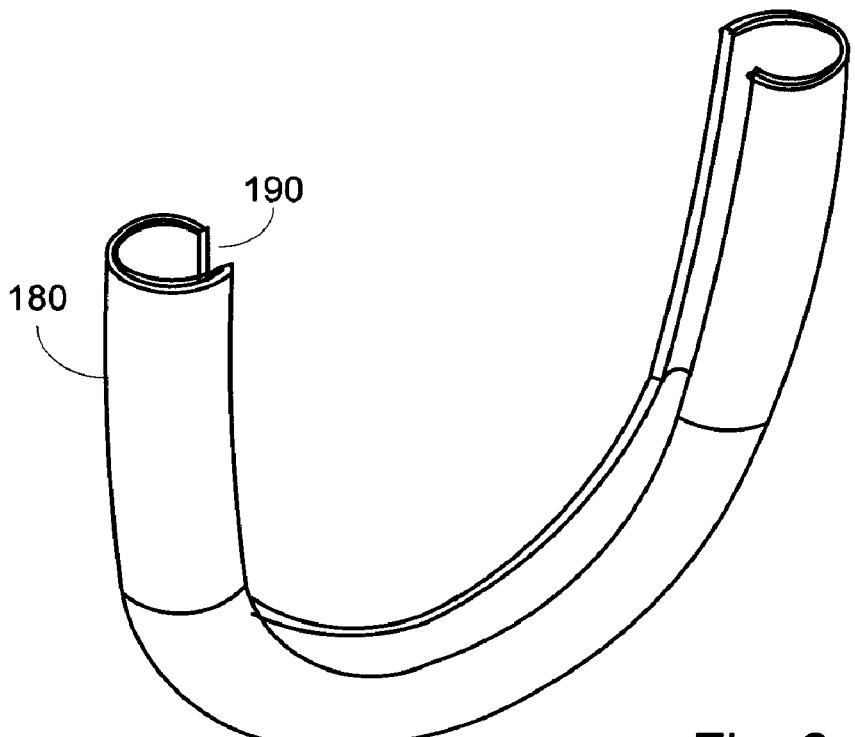
FIG. 9 is a side perspective view of an alternative embodiment of a spring seal.

FIG. 9 shows an alternative embodiment of a spring seal 180. The spring seal 180 is similar to the spring seal 100 above but with a radial opening 190 along one side thereof. Specifically, a portion of the diameter is removed or is missing so as to form the radial opening 190. The spring seal 180 may be positioned within the sealing slot 130 in a manner similar to that described above.

The spring seal 100, 180 may come in any shape or orientation including those in a substantial "E", "W", "V", "O", or other common seal shapes. The opening, such as the axial opening 110, the radial opening 190, and the like, may be positioned either parallel to the leakage path or perpendicular to it. Other configurations also may be used herein.

Use of the sealing system 100 thus reduces leakage through the gap 90. Sealing efficiency similar to that of the commonly used aluminum coating thus may be found and improved upon without the use of the aluminum material. The reduction of cooling flow leakage improves overall system efficiency. The spring seal system 120 may be used with other sealing systems and methods.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A spring seal system for a turbine dovetail tab, comprising: a first leg positioned on a high pressure side of the tab; a second leg positioned on a low pressure side of the tab; a sealing slot positioned between the first leg and the second leg in a middle portion about the tab; a first gap between the first leg and the sealing slot; a second gap between the second leg and the sealing slot; and a spring seal positioned within the sealing slot; the spring seal comprising a substantial "U" shape.

2. The spring seal system of claim 1, wherein the spring seal comprises a substantial "C" shape in cross-section.

3. The spring seal system of claim 1, wherein the spring seal comprises a high temperature resistant material.

4. The spring seal system of claim 1, wherein the spring seal comprises stainless steel or alloys of nickel, iron, or cobalt.

5. The spring seal system of claim 1, wherein the spring seal comprises an axial opening.

6. The sealing system of claim 1, wherein the axial opening faces the second leg.

7. The sealing system of claim 1, wherein the spring seal comprises a radial opening.

8. The sealing system of claim 7, wherein the radial opening faces the second leg.

9. A spring seal system for a turbine dovetail tab, comprising: a sealing slot positioned about middle portion of the tab; the sealing slot defining a first leg and a second leg; a first gap between the first leg and the sealing slot; a second gap between the second leg and the sealing slot; and a spring seal positioned within the sealing slot; the spring seal comprising an opening facing the second leg.

10. The spring seal system of claim 9, wherein the spring seal comprises a substantial "U" shape.

11. The spring seal system of claim 9, wherein the spring seal comprises a substantial "C" shape in cross-section.

12. The spring seal system of claim 9, wherein the spring seal comprises a high temperature resistant material.

13. The spring seal system of claim 9, wherein the spring seal comprises stainless steel or alloys of nickel iron, or cobalt.

14. The spring seal system of claim 9, wherein the first leg is positioned about a high pressure side and the second leg is positioned about a low pressure side.

15. The spring seal system of claim 9, wherein the opening comprises an axial opening.

16. The spring seal system of claim 9, wherein the opening comprises a radial opening.

* * * * *